United States Patent [19]

Gollomp

[11] 4,164,786

[45] Aug. 14, 1979

[54] APPARATUS FOR EXPANDING MEMORY SIZE AND DIRECT MEMORY ADDRESSING CAPABILITIES OF DIGITAL COMPUTER MEANS

[75] Inventor: Bernard P. Gollomp, Far Rockaway, N.Y.

[73] Assignee: The Bendix Corporation, Teterboro, N.J.

[21] Appl. No.: 895,167

[22] Filed: Apr. 11, 1978

[51] Int. Cl.² .................................................. G06F 1/00
[52] U.S. Cl. ..................................................... 364/200
[58] Field of Search ... 364/200 MS File, 900 MS File

[56] References Cited

U.S. PATENT DOCUMENTS

| 3,535,560 | 10/1970 | Cliff | 364/200 |
| 3,736,569 | 5/1973 | Bouricius et al. | 364/200 |
| 3,855,577 | 12/1974 | Vandierendonck | 364/200 |
| 4,006,456 | 2/1977 | Wilk | 364/200 |

Primary Examiner—Gareth D. Shaw
Assistant Examiner—C. T. Bartz
Attorney, Agent, or Firm—Anthony F. Cuoco; William F. Thornton

[57] ABSTRACT

Apparatus for expanding the direct addressing range and memory size of digital computer means by managing memory device power and controlling memory device/processing unit interfaces by input/output (I/O) instructions. Memory modules are provided which are selectively powered in response to the (I/O) instructions to provide the aforenoted expansion.

5 Claims, 2 Drawing Figures

APPARATUS FOR EXPANDING MEMORY SIZE AND DIRECT MEMORY ADDRESSING CAPABILITIES OF DIGITAL COMPUTER MEANS

DESCRIPTION OF THE INVENTION

1. Field of the Invention

This invention relates generally to digital computer means and particularly to digital computer means having limited memory range and direct memory addressing capability. More particularly, this invention relates to apparatus for expanding said memory range and direct memory addressing capability.

2. Prior Art

The direct addressing range of digital computer means such as a microprocessor, for example, is limited by the number of bits of the memory/program counter register in the central processing unit of the microprocessor.

If a particular applications program is larger (requires more memory) than the memory that can be directly addressed, the practice has heretofore been to logically partition (modularize) the applications program and store it in mass storage devices. During program execution, memory from a mass storage device is read in a logical execution sequence into the microprocessor. The applications program, either directly or through an operating or executive program, requests program execution continuation in the next logical applications program (module) partition. A utility program/routine, which is part of the operating system, implements the reading of the next logical program module from the mass storage means and implements the storage of this information in the microprocessor memory for subsequent execution. In this connection it is noted that the mass storage means referred to can be a magnetic tape, a magnetic disc, a floppy disc, or even punched tape or cards, as the case may be. It should also be noted that if either the operating system, the executive program or even specialized programs are too large to be co-resident within the computer with an applications program, they too must be partitioned (modularized) into memory/read sequences from mass storage means and stored in the microprocessor memory as heretofore noted.

If program, operating systems, executive programs or referenced programs and the like are so modularized, stored and read, mass storage devices and supporting utility programs must be provided and time must be allocated for the storing and reading functions and for verifying correctness of information so processed. System reliability is encroached upon by the incorporation of the mass storage devices, while in some applications the time associated with the aforenoted data processing is simply not available.

SUMMARY OF THE INVENTION

This invention contemplates apparatus for overcoming the aforenoted disadvantages due to limited memory size and limited direct memory addressing capabilities of digital computer means by increasing the direct addressing range and increasing the memory size of the computer means. Since increasing the direct addressing range is frequently precluded by the computer architecture, an implementation including transference addressing range means is required for providing what is in effect an infinite memory expansion. This is achieved in the present invention by managing memory power and by memory/computer interfacing with devices that can be controlled by computer input/output (I/O) instructions. For example, where the memory devices include read only memory devices (ROMs), programmable read only memory devices (PROMs) or magnetic devices such as core film, the arrangement is such that the memory devices are only active when powered. In the unpowered state they are connected to their signal interfaces, i.e., address, input/output data, in a purely passive manner. By configuring the memory devices in modules whose size is either less than or equal to the size (range) of the computer memory, selectively connecting the modules to the data and address buses of the computer and by controlling power application via I/O instructions, computer direct addressing range and memory size is expanded virtually indefinitely. Mass storage devices are not needed, processing time is not required and computer reliability is enhanced as compared to heretofore known means for accomplishing the purposes of the invention.

DESCRIPTION OF THE PREFERRED EMBODIMENT OF THE INVENTION

Figure 1:
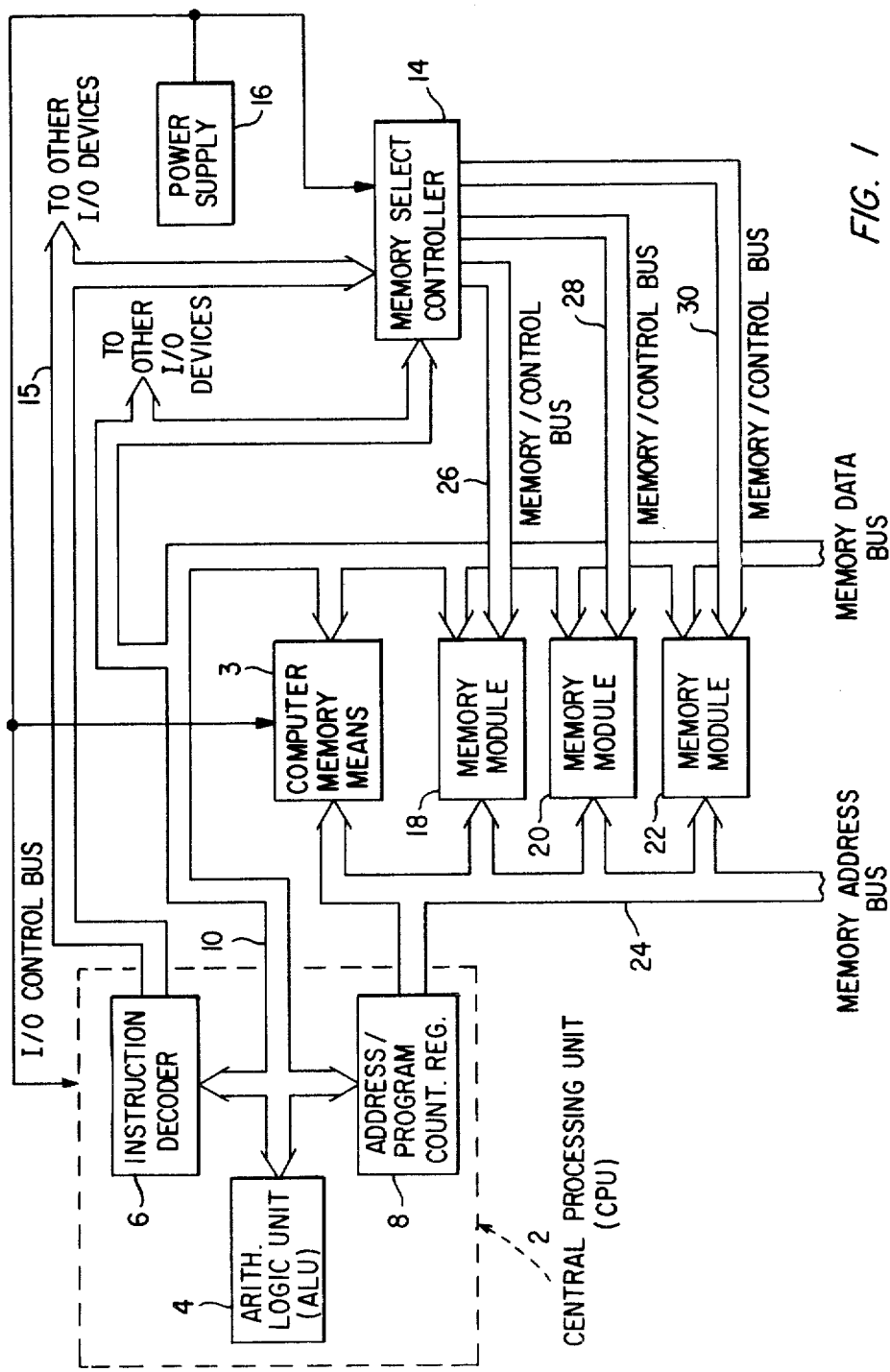
FIG. 1 is a block diagram showing a computer and the interfaces therefrom to apparatus for expanding memory size and direct memory addressing capabilities of the computer in accordance with the invention.

With reference to FIG. 1, computer means such as a microprocessor includes a conventional central processing unit (CPU) designated generally by the numeral 2 and conventional memory means designated generally by the numeral 3. CPU 2 is shown as including an arithmetic logic unit (ALU) 4, an instruction decoder 6 and an address/program counter register 8 connected within the CPU through a memory data bus 10. Memory data bus 10 leads from CPU 2 to memory select controller designated generally by the numeral 14 and which will be described in detail with reference to FIG. 2. An input/output (I/O) control bus 15 leads from instruction decoder 6 in CPU 2 to memory select controller 14.

A suitable power supply designated generally by the numeral 16 applies power to memory select controller 14 as will be hereinafter shown with reference to FIG. 2, and applies power to the appropriate components of central processing unit 2 as well as to computer memory means 3 as shown in FIG. 1.

The expansion feature of the invention is shown as including three memory modules designated by the numerals 18, 20 and 22. There such modules are shown for purposes of illustration, but any number of modules may be used depending on the desired expansion capabilities of the invention as will be understood by those skilled in the art. In this connection, memory modules 18, 20 and 22 may be, for purposes of illustration, programmable read only memorys (PROM's) such as manufactured by Texas Instruments, Inc. and marketed under their trade designation TMS 2716JL. The devices may be 2,048 word by 8-bit erasable PROM's as described in the Texas Instruments, Inc. preliminary data sheet of March, 1977 and in this respect have a range less than or equal to the range of computer memory means 3.

A memory address bus 24 leads from address/program counter register 8 in central processing unit 2 to computer memory means 3 and to each of the memory modules 18, 20 and 22. Likewise, memory data bus 10 leads to computer memory means 3 and to each of the memory devices 18, 20 and 22 as shown in FIG. 1.

Memory select controller 14 provides memory access control signals and memory power signals which are applied over memory control buses 26, 28 and 30 to memory modules 18, 20 and 22, respectively, as will next be described with reference to FIG. 2.

Figure 2:
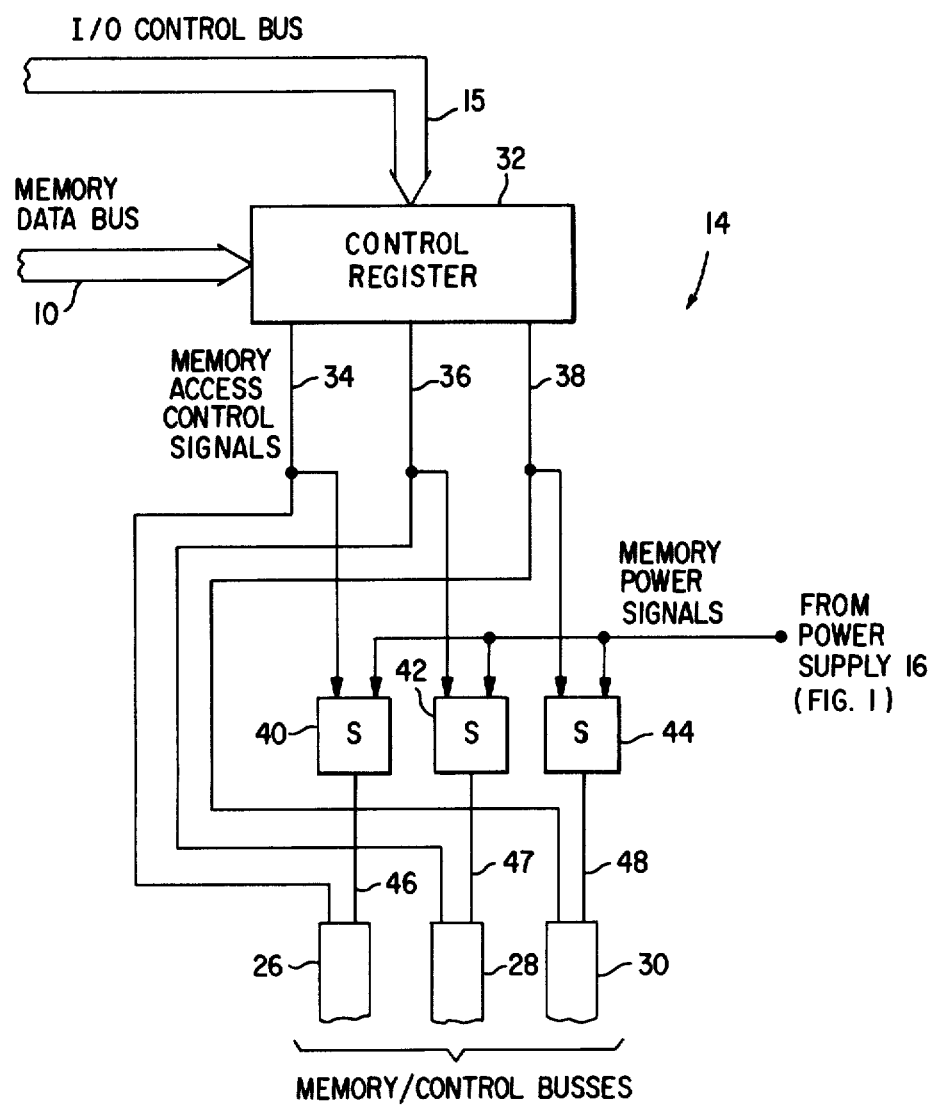
FIG. 2 is a block diagram showing in substantial detail a memory select controller shown generally in FIG. 1.

FIG. 2 shows memory select controller 14 in substantial detail. It will be seen that the memory select controller includes a control register 32 which may be a conventional storage register of the type well known in the art. I/O control bus 15 and memory data bus 10 (FIG. 1) lead to control register 32.

Control register 32 provides memory access control signals at output conductors 34, 36 and 38 thereof, and which memory access control signals are carried by memory control buses 26, 28 and 30, respectively.

Memory access control signal conductor 34 is connected to an electronic switch 40, memory access control signal conductor 36 is connected to an electronic switch 42 and memory access control signal conductor 48 is connected to an electronic switch 44. Switches 40, 42 and 44 may be of the conventional transistor type and are normally in the non-conductive state.

Power supply 16 (FIG. 1) is connected to each of the electronic switches 40, 42 and 44. Switches 40, 42 and 44 are arranged so as to be rendered selectively conductive by different control states of the respective memory access control signals and to thereby pass power over memory power conductors 46, 47 and 48 carried by buses 26, 28 and 30, respectively, leading to memory modules 18, 20 and 22 as shown in FIG. 1.

With the above structural arrangement in mind, it will first be understood that computer memory means 3, powered by power supply 16, is always actively connected to memory address bus 24 and to memory data bus 10. System memory as provided by computer memory means 3 is expanded by selectively powering memory modules 18, 20 and 22, whereby the memory modules respond to the information transferred thereto via memory address bus 24 and memory data bus 10.

During the execution of a program, when the computer memory must be expanded by accessing a memory module 18, 20 or 22 to continue program execution, obtain data or any combination thereof, computer memory means 3 contains one or more output instructions. The program in execution also contains such output instructions. When such an output instruction is executed, (decoded by instruction decoder 6 in central processing unit 2), control information is transmitted to control register 32 in memory select controller 14 via bus 15, while at the same time control information, i.e., the logic state of the information transmitted over bus 15, is transmitted via bus 10 to control register 32. The control information and the logic information render control register 32 in different control states. These control states in turn cause one of the switches 40, 42 or 44 to be turned on (rendered conductive), whereby power is carried via memory/control buses 26, 48 or 30 to the corresponding memory modules 18, 20 or 22. Additionally, control information required for accessing the particular memory module is carried by the appropriate memory/control bus.

It will now be seen from the aforegoing description of the invention with reference to the Drawing, that memory select controller 14 shown generally in FIG. 1 and in substantial detail in FIG. 2 is responsive to an input/output instruction for applying power to an appropriate memory module. The memory module receiving such power is in effect actively connected to the computer in addition to computer memory means 3 for expanding the direct addressing range and memory size which had been previously available. Thus, the direct addressing range of the computer and its memory size is increased by managing memory device power and controlling memory device/computer interfaces by computer input/output instructions as will now be understood by those skilled in the art.

What is claimed is:

1. For use with digital computer means of the type including a central processing unit, memory data signal transmitting means and memory address signal transmitting means connected to the central processing unit, memory means actively connected to both of said signal transmitting means and input/output control signal transmitting means connected to the central processing unit, apparatus for expanding the direct addressing range and memory size of the computer means, comprising:

a plurality of memory modules passively connected to the memory address signal transmitting means and to the memory data signal transmitting means;

a power supply;

controller means connected to the power supply, to the memory data signal transmitting means, to the input/output control signal transmitting means and to the memory modules, and responsive to signals transmitted by both of said signal transmitting means for being rendered in different control states whereby power signals and memory access control signals are selectively transmitted from the controller to one of the memory modules;

the controller means including a control register connected to the memory data signal transmitting means and to the input/output signal transmitting means, and responsive to the signals transmitted by both of said means for being rendered in different control states to provide a plurality of memory access control signals, a corresponding plurality of switching means normally in a non-conductive state connected to the power supply and to the control register and responsive to the memory access control signals, with one of said signals selectively rendering one of the switches conductive for passing a power signal, and the one memory module connected to the control register and to the conductive switching means and responsive to the power signal and the one memory access control signal for being actively connected to the memory address and memory data signal transmitting means; and the one memory module responsive to the power and memory access control signals transmitted thereto for being actively connected to the memory address and memory data signal transmitting means in addition to the memory means being actively connected to both of said signal transmitting means.

2. Digital computer means as described by claim 1, wherein:

each of the memory modules has a range equal to or less than the range of the memory means.

3. Digital computer means, comprising:
a central processing unit;
memory data signal transmitting means connected to the central processing unit;
memory address signal transmitting means connected to the central processing unit;
computer memory means actively connected to both of said signal transmitting means;
at least one memory module passively connected to both of said signal transmitting means;
a power supply;
input/output control signal transmitting means connected to the central processing unit;
controller means connected to the power supply, to the memory data signal transmitting means, to the input/output control signal transmitting means and to the memory module, and responsive to signals transmitted by both of said signal transmitting means for being rendered in a control state whereby a power signal and a memory access control signal are transmitted from the controller to the memory module,
the controller means including a control register connected to the memory data signal transmitting means and to the input/output signal transmitting means, and responsive to the signals transmitted by both of said means for being rendered in a control state to provide a memory access control signal, switching means normally in a non-conductive state connected to the power supply and to the control register and responsive to the memory access control signal for being rendered conductive and for passing a power signal, and the memory module connected to the control register and to the conductive switching means and responsive to the power signal and the memory access control signal for being actively connected to the memory address and memory data signal transmitting means; and
the memory module responsive to the signals transmitted thereto for being actively connected to the memory address and memory data signal transmitting means in addition to the memory means being actively connected to both of said signal transmitting means for expanding the direct addressing range and memory size of the computer means.

4. Digital computer means as described by claim 3, wherein:
the one memory module has a range equal to or less than the range of the computer memory means.

5. Digital computer means, comprising:
a central processing unit;
memory data signal transmitting means connected to the central processing unit;
memory address signal transmitting means connected to the central processing unit;
computer memory means actively connected to both of said signal transmitting means;
other memory means passively connected to both of said signal transmitting means;
a power supply;
input/output control signal transmitting means connected to the central processing unit;
controller means connected to the power supply, to the memory data signal transmitting means, to the input/output control signal transmitting means and to the other memory means, and responsive to signals transmitted by both of said signal transmitting means for being rendered in different control states whereby power signals and memory access control signals are selectively transmitted from the controller to the other memory means;
the other memory means being responsive to the power and memory access control signals transmitted thereto for being actively connected to the memory address and memory data signal transmitting means in addition to the memory means being actively connected thereto for expanding the direct addressing range and memory size of the computer means; and
the other memory means includes a plurality of memory modules passively connected to the memory address signal transmitting means and to the memory data signal transmitting means, the controller means selectively transmitting the power signals and the memory access control signals to one of the memory modules, and the one memory module responsive to power and memory access signals transmitted thereto for being actively connected to the memory address and memory data signal transmitting means.

* * * * *